June 9, 1964  A. S. BEECH ETAL  3,136,335
APPARATUS FOR CONTROLLING SERIES OF OPERATIONS
Filed Nov. 17, 1961  3 Sheets-Sheet 1
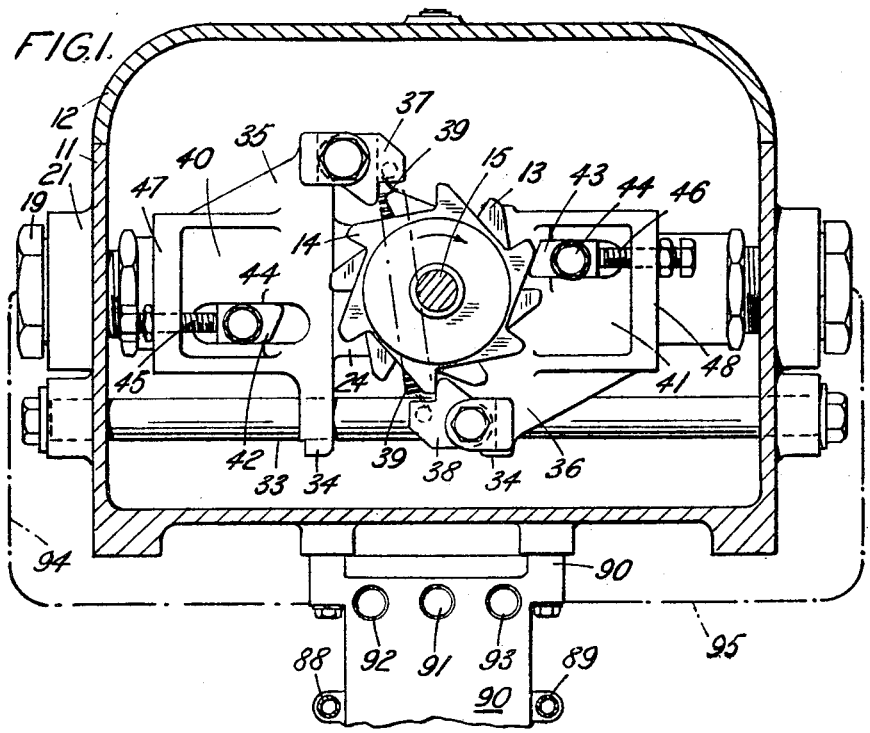
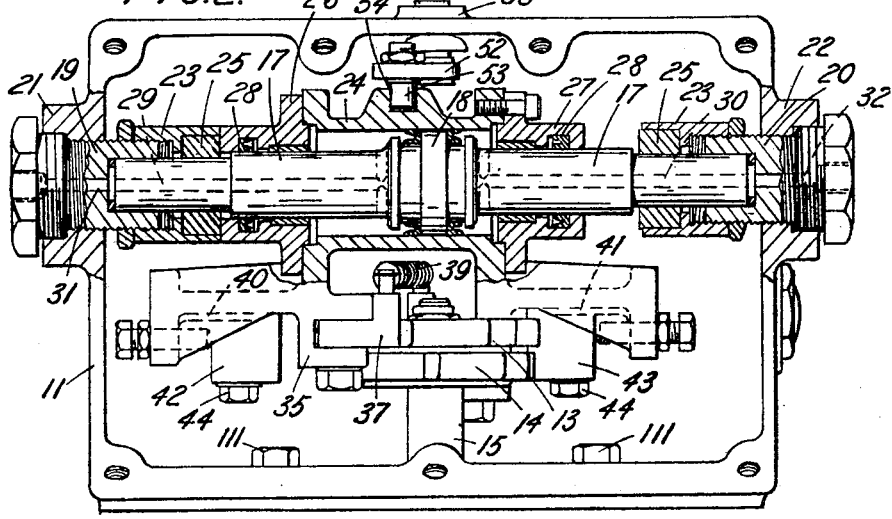

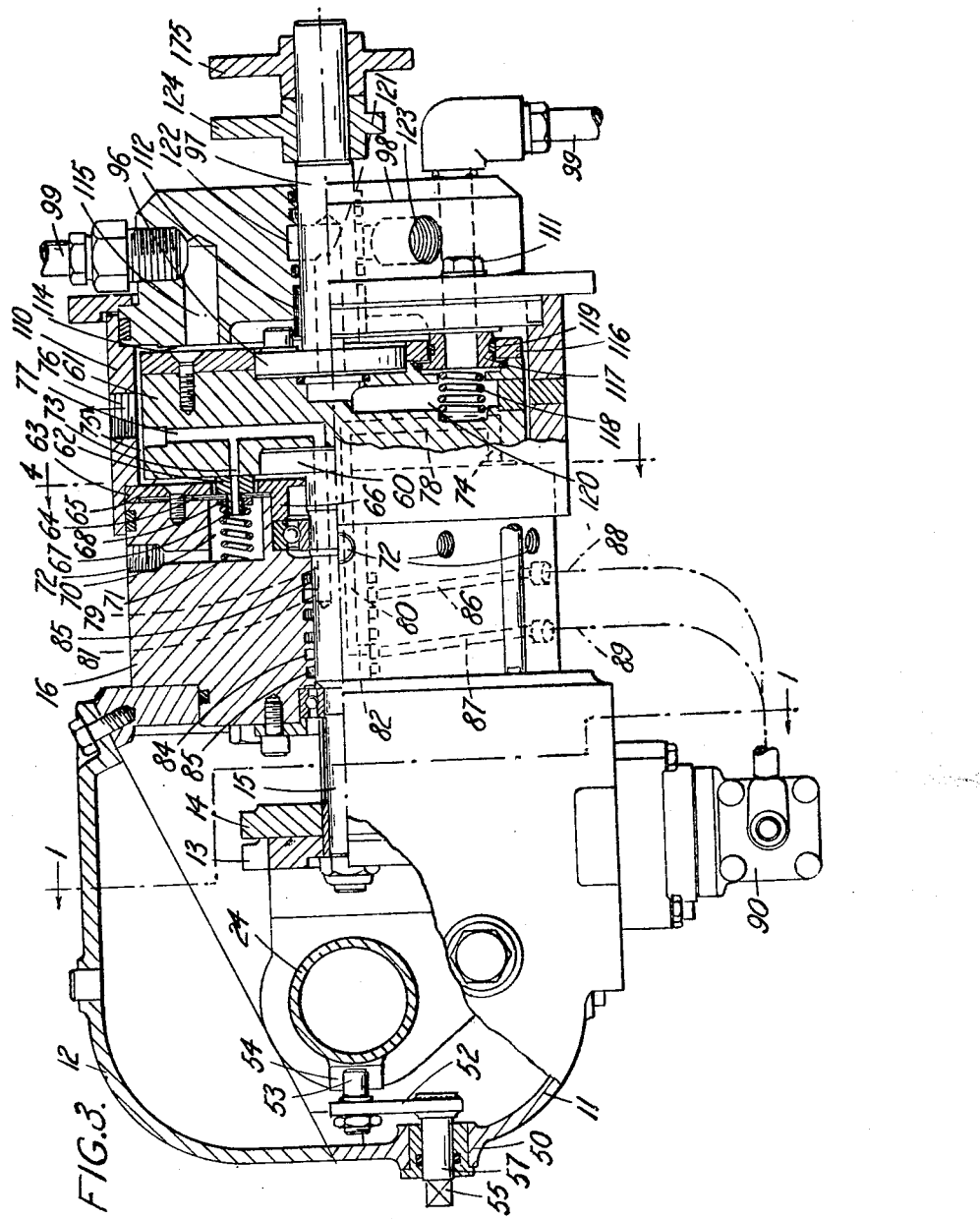

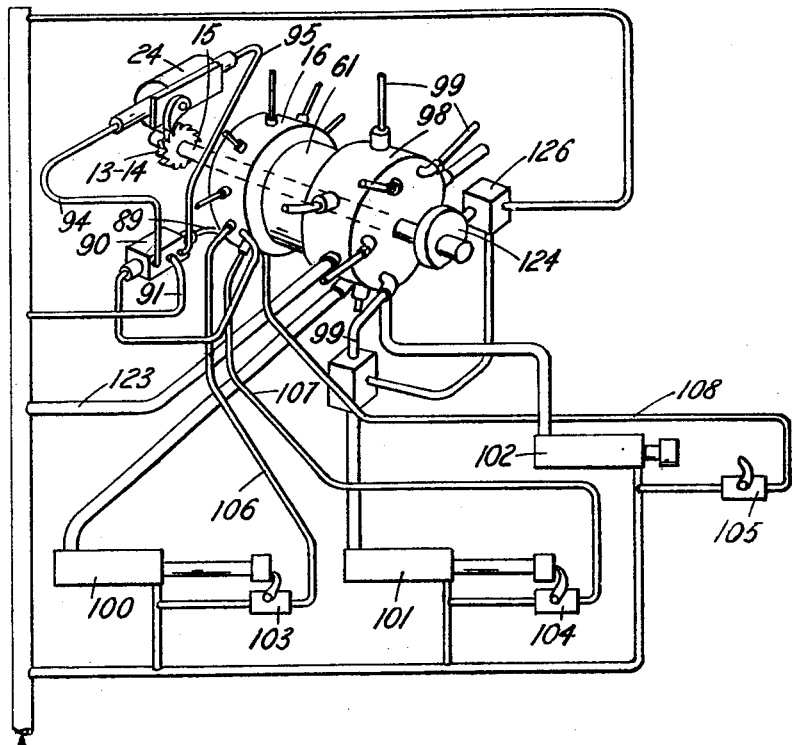
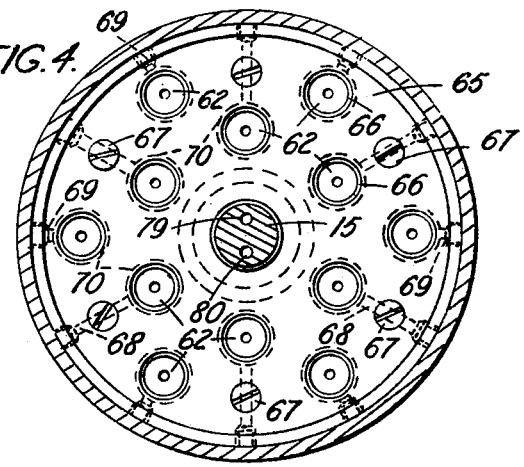

United States Patent Office 3,136,335
Patented June 9, 1964

3,136,335
APPARATUS FOR CONTROLLING SERIES
OF OPERATIONS
Austin Sidney Beech and Thomas Spencer, both of Leighton Buzzard, England, assignors to Austin S. Beech & Company Limited, Leighton Buzzard, England, a British company
9 Claims. (Cl. 137—624.13)

This invention comprises improvements in or relating to apparatus for controlling series of operations.

In many machines which are automatically operated it is necessary for a cycle of operations to be automatically repeated but the times of the various operations are not rigidly fixed and a new operation can only be commenced when a signal is given by the apparatus that a former operation has been completed. Such conditions occur for example in automatic foundry moulding machines, in die-casting or plastic injection moulding machines, in automatic machine tools and in many other kinds of apparatus which may be operated pneumatically, hydraulically or electrically.

It is an object of the present invention to provide a unit for controlling such operation, which is adaptable to a variety of conditions and which serves to gather together in itself a large part of the essential features of control and thus to simplify the layout of the machine.

According to the present invention a unit for controlling the initiation of a series of operations in accordance with signals delivered to it, comprises in combination a control rotor, means for rotating it stepwise, a signal-receiver movable stepwise by the control rotor, a series of signal-delivery elements disposed so that the signal-receiver registers with one delivery element at each step and is then capable of receiving a signal therefrom, means whereby the signal receiver, on receipt of a signal, energises the means for rotating the control rotor to move it one step, whereby the signal-receiver is moved into register with the next signal-delivery element, and an operation controller movable stepwise by the control rotor and capable in its various positions of initiating different operations.

The nature of the signals, the means for rotating the control rotor and the nature of the control exercised by the operation controller may vary.

In the form of unit hereinafter described the means for rotating the control rotor stepwise consists of a pneumatically-operated ratchet mechanism and the signals received by the signal-receiver are pneumatic pulses, but in either case electrical or hydraulic means might be adopted. The operation controller may actuate either a pneumatic circuit or an electrical or hydraulic or other control circuit.

In the preferred form of apparatus the signal-receiver actuates a pneumatic or electrical relay by which the power applied to the step by step mechanism is amplified. The operation controller may also actuate a relay if desired.

In some instances it is desirable to hold a machine part which has been moved in one operation while other operations proceed, and not to return it to its initial position until a later point in the cycle. According to the present invention this can be allowed for by the addition of appropriate cam or like mechanism to the operation controller, in such manner as to actuate holding valves or the like over various portions of the cycle, and preferably the control unit is so constructed that the changing of cams for this purpose is a quick and simple operation.

The following is a description, by way of example, of one construction in accordance with the invention:

Referring to the accompanying drawings,

FIGURE 1 is a vertical section of the apparatus, upon the line 1—1 of FIGURE 3, looking in the direction of the arrows;

FIGURE 2 is a plan, with cover removed;

FIGURE 3 is a side elevation partly in section looking from the left as viewed in FIGURE 1;

FIGURE 4 is a section on the line 4—4 of FIGURE 4, looking in the direction of the arrows, and FIGURE 5 is a diagram of connections.

The unit comprises a casing 11 having a removable cover 12 and containing a control rotor which takes the form of two ratchet wheels 13, 14 mounted on a shaft 15 which passes through one wall of the casing and is supported in ball bearings in a thick block 16 of metal secured to the outside of the wall and hereinafter referred to as the signal-block. The part of the rotor shaft 15 inside the casing 11 which carries the ratchet wheels is overhung and extends only a part of the way across the casing. Each ratchet wheel has six teeth and they are keyed to the shaft so that the teeth of one wheel are midway between the teeth of the other wheel, thus forming in effect a 12-toothed ratchet.

Extending across the casing at right angles to the rotor shaft 15 and in the space beyond the end of the shaft, is a fixed piston rod 17, best seen in FIGURE 2, which carries a piston 18 at its centre. The piston rod 17 is gripped endwise firmly between socket members 19, 20 which are screwed into lugs 21, 22 in the wall of the casing 11 opposite each end of the rod and prevent the rod from moving. The screwed exterior of the socket member 19, 20 extends into the casing and each member carries a screwed sleeve 23, the end of which projects from the socket member around the piston rod and carries a rubber buffer 25. On the piston rod there slides a double-acting cylinder 24, the ends of which are closed by appropriate fittings 26, 27 which carry fluid-tight glands 28. The cylinder 24 has a limited stroke between the buffers 25.

Owing to the fact that the cylinder reciprocates, fluid pressure connections for operating it are not taken to it direct, but are taken through the centre of the piston rod 17, one from each end, by fluid passages 29, 30 in the rod and passages 31, 32 leading through the screwed sleeves 19 and 20 which hold the rod in place.

In the casing 11 below the cylinder and parallel with its direction of movement, there is secured a guide bar 33 (FIGURE 1) and lugs 34 on the cylinder ends extend downwardly into engagement with the guide bar 34 so that the cylinder is prevented from rotating about the axis of the piston rod 17. Each end of the cylinder furthermore carries one of two lugs 35, 36 on which are pivoted two pawls 37, 38 respectively, one pawl 37 being above the ratchet wheels and the other 38 below. The plane of movement of the pawls is such that the lower one engages with the outermost ratchet wheel 14 of the control rotor and the upper one engages with the inner wheel 13. The two pawls are drawn towards one another and therefore towards the ratchet teeth by a spiral tension spring 39 which extends between them. The lugs 35, 36 which carry the pawls are formed in one piece with the body of the cylinder 24 and associated with each lug is a flat face 40 or 41 on the side of the cylinder which faces towards the ratchet wheels and is slotted in a direction parallel to the movement of the cylinder to receive two adjustable stops 42, 43. The stops are secured in the slots in the flat face by set-screws 44 passing through the slots in the faces 40, 41 and each stop occupies such a position that when the cylinder has completed a stroke in one direction, carrying with it the pawls 35, 36 which engage the ratchet wheels, and one of the pawls causes the rotor to advance one-twelfth of a revolution, the stop will engage the back of another tooth on the ratchet wheel and prevent overrun. For example, in FIGURE 1 the stop 38 is shown as having advanced the rotor by engagement with one of the teeth of ratchet wheel 14 and the stop 43 is abutting on the back of another tooth of wheel 14 and preventing overrun. When the cylinder makes a stroke in the other direction the other pawl 37 engages the other ratchet wheel 13 and advances the rotor by a further amount of one-twelfth of a revolution, whereupon the stop 42 corresponding to this other pawl will engage the back of a ratchet tooth and again prevent overrun. The stops can be exactly adjusted along the slots in which they are mounted by loosening their setscrews 44 and screwing up or unscrewing an adjusting setscrew 45 or 46 which passes through a flange (47 or 48) on the end of one of the flat faces 40, 41 above referred to, in a direction parallel to the movement of the cylinder. Thus great exactitude of movement of the rotor at each step is afforded without any possibility of overrunning or missing a tooth.

In the wall of the casing 11 opposite to the wall which carries the signal-block 16 and at a lever below the axis of the rotor shaft, there is a lug 50 through which passes a rock shaft 51 (FIGURE 3). Within the casing the rock shaft carries a crank 52 and a crank pin 53 and the crank pin engages a vertical slot 54 in the wall of the cylinder 24 which lies opposite to the ratchet mechanism. Outside the casing the rock shaft carries a square 55 and if a spanner or key is applied to the square the cylinder can be reciprocated by hand, without the use of fluid pressure, to move the control rotor stepwise, either for the purpose of testing, or setting the ratchet stops, or of controlling a part of a machine cycle by hand.

Outside the signal-block 16 the rotor shaft 15 has a head 60 on which is mounted a disc 61 hereinafter referred to as the signal-receiver. The signal-receiver has a ground and polished or lapped face 65 which bears against a series of signal-delivery elements 62 carried by the signal-block 16. The signal-delivery elements 62 consist of twelve nozzles which have stems 67 and are secured by nuts 68 in a rubber diaphragm 64 carried by the signal-block and the nozzles are disposed in two circles of different diameter as shown in FIGURE 4 so that a nozzle in the circle of smaller diameter alternates with a nozzle in the circle of larger diameter. The rubber diaphragm is clamped by a suitable clamping plate 63 firmly to the signal-block 16. The clamping plate 63 has apertures 66 which surround the nozzles 62 with a clearance. It is secured to the block 16 by screws 67. Each of the nozzles lies in front of a signal air chamber 70 bored in the signal-block and the air chamber contains a spiral spring 71 which together with the air pressure urges the nozzle into contact with the polished face 65 of the rotatable signal-receiver. Radial tapped holes 72 around the periphery of the signal-block communicate with the air chambers by radial passages 68, 69 and a signal pipe can be led to each tapped hole.

The signal-receiver 61 carries two ports 73, 74 which are diametrically opposite to one another, one port 74 being at a radius corresponding to the outer circle of signal-nozzles 62 and the other port 73 at a radius corresponding to the inner circle. As a result, in any given position of the signal-receiver, one port (73 or 74) will be in communication with a nozzle of its circle and the other port will be in communication with the space between two nozzles of the other circle. If the signal-receiver is rotated through one-twelfth of a revolution by the ratchet-control rotor, the port which was in communication with a nozzle will find itself in commmunication with the space between two nozzles, and the other port which was in communication with the space will find itself in communication with a nozzle. If pressure is delivered through the nozzles the ports will therefore receive pressure alternately and will be alternately connected to the space between nozzles, which is in communication with the space 75 around the signal-receiver 61 and with exhaust port 76.

The two ports in the signal-receiver communicate by drilled passages 77, 78 with two parallel passages 79, 80 drilled in the rotor shaft 15, and these passages extend to ports 81, 82 in the side of the shaft where it passes through the signal-block 16 between the two ball bearings. The ports 81, 82 register with two annular recesses 83, 84 in the signal-block which are sealed off by sealing rings 85 between then and on each side. The annular recesses are connected by radial passages 86, 87 in the underside of the signal-block to two signal-pipes 88, 89.

The signal-pipes lead to the opposite ends of a pneumatically-operated valve 90 secured to the underside of the control rotor casing. This valve contains a shuttle valve-member of the usual type and is supplied with compressed air at the opening 91 (FIGURE 1), which the shuttle valve distributes to one or other of two pipe connections 92, 93. The connection 92 is connected by a pipe 94, indicated by a chain-line, to the screwed member 19 and thence by passage 29 to the left-hand end of cylinder 24. The connection 93 goes by pipe 95 to the other end of the cylinder. The valve 90 thus serves to deliver compressed air alternately to the two ends of the air cylinder of the ratchet mechanism. If one signal-pipe 88 or 89 is supplied with pressure and the other connected to exhaust, the ratchet cylinder is moved in one direction, and if the other signal-pipe is supplied with pressure and the first connected to exhaust the ratchet cylinder is moved back.

The rotary signal-receiver 61 contains in its opposite face to that which is secured to the rotor shaft a recess which receives the head 96 of the shaft 97 of an operation-controller and which will therefore be referred to as the operation-control shaft. The operation-controller may take various forms but in the particular form about to be described the signal-receiver 61 itself contains passages which form part of the operation-controller, the cooperating part of which is a fixed valve block 98. In the construction described the operation-controller at each step of the ratchet mechanism can supply air under pressure to one of a series of operation pipes 99 which are connected to the valve block 98. Each pipe 99 is intended to lead to a jack or motor or the like, such as one of those shown at 100, 101, 102, FIGURE 5, which is set in operation when the controller delivers air to the pipe and when the jack or other device has completed a movement it will actuate a limit valve 103, 104 or 105 for sending air by means of a signal-pipe 106, 107 or 108 to one of the signal air-chambers 70 in the signal-block 16. If the pipe connections are properly made the effect will be that signal air, entering the air chamber 70 will be led by the signal-controller to the appropriate end of the pneumatically-operated valve 90 which will be actuated to cause the ratchet mechanism to make one single stroke. This will reverse the connections to the signal-pipes 88, 89 between the signal-block 16 and the valve, but it will not reverse the valve until the next air chamber 70 in the signal-block receives air upon the termination of the next machine operation. Accordingly the ratchet mechanism makes no further movement until the next machine operation is completed.

The operation-controller valve-block 98, when the ratchet mechanism has moved a step, directs air to the next jack or motor or the like on the machine and when this has completed a machine movement it sends back a signal to the signal-block which enables another step to be made. Thus the operations proceed under the control of the unit without any further complication beyond the necessary pipework between the unit and the various jacks or motors of the machine.

The construction of the operation-controller in the particular example now being described is as follows:

The fixed cylindrical valve block 98 is secured to the signal-block 16 by means of an intermediate sleeve 110 which surrounds the rotary signal-receiver 61 and by setscrews 111 which secure the whole together. The valve block 98 contains a bearing bush 112 for the operation control shaft 97 which shaft projects outwardly beyond the block. The inner face 114 of the valve block is ground and lapped and contains a circle of twelve ports 115, most of which, or as many of which are necessary for the operations of the machine, are connected to the air pipes 99 leading to the jacks or motors on the machine. The face of the signal-receiver disc 61 which lies towards the ports acts as a distributor and carries a nozzle-holding ring 116 in which there is mounted slidably a nozzle 117 capable of registering with the ports and pressed towards them by a spring 118. The nozzle is sealed by a sealing ring 119 to the ring 116 and a passage 120 within the disc 61 communicates with a passage 121 in the centre of the operation-control shaft 97. This passage communicates with an annular recess 122 around the shaft in the centre of the operation-control block 98 and the recess is connected by a radial tapped hole 123 with an air supply pipe. Thus at each stop the nozzle 117 will supply air under pressure to a different port 115 and thence by one of the pipes 99 to a jack such as 100 of the machine. The space around the nozzle 117 is in communication with the annular space 75 surrounding the signal-receiver which is open to exhaust at 76. Thus all the jacks except the one which is being supplied with pressure will be connected to exhaust.

If this were all, every jack could only be operated during one step of the machine, but in some cases this is not sufficient because a jack may require to be held on, while other operations are proceeding. To enable this to be done cams 124, 125 can be mounted on the end of the operation-control shaft, which control valves (not shown in FIGURE 3) in the circuit leading to the jacks or motors 100, 101 or 102. Any one jack or motor can be held on after it has completed a stroke for as long as desired by operating a hold-on valve 126 (FIGURE 5) through one of the cams 124 or 125 the valve being arranged in the pipe leading to that jack or motor. Thus, any desired combination of operations can be effected.

It will be obvious that instead of ports for compressed air, the signal-receiver might be arranged with electric contacts to be energised for electric signal lines and similarly the operation-controller might operate through electric contacts instead of by a movable nozzle. The ratchet mechanism might also be electromatically-operated instead of by compressed air. Alternatively, some or all of these operations might be effected hydraulically or by any other form of power applied.

We claim:

1. A control unit for the purpose described comprising in combination a rotor shaft, pneumatically-operated ratchet means for rotating the rotor shaft stepwise, a signal-rotor forming part of a signal-receiver mounted upon the rotor shaft having a rotatable valve-face containing a port, a stationary signal block, forming another part of the signal-receiver, adjacent to the signal-rotor and having a plurality of ports with which the ports in the signal-rotor registers seriatim, passages in the signal block to connect the ports thereof with signal pipes, means to connect the port in the signal-rotor with the pneumatically-operated ratchet mechanism to actuate the same upon receipt of a pneumatic pulse through one of the ports in the signal-block of the signal-receiver, an operation-controller having a movable element which is mounted on the rotor shaft and carries an operation-control port, the operation-control port at each step of the rotor shaft registering with one of a series of ports in a fixed distribution-block and means to connect the ports in the distribution-block to pipes for operating parts of a machine which is to be controlled by the unit.

2. A control system for a machine having self-acting devices for effecting its functions, comprising a control unit as claimed in claim 1, limit-valve means for actuation by moving parts of the machine at the conclusion of each self-acting operation of the machine, means for connecting said limit-valve means to the signal-receiver of the control unit to accord signals thereto and means connecting the operation-controller at each step of the unit to the appropriate self-acting device on the machine to effect the next function.

3. A control unit for the purpose described comprising in combination a rotor shaft, fluid pressure operated ratchet means for rotating the rotor shaft stepwise, a signal-rotor forming part of a signal-receiver mounted upon the rotor shaft having a rotatable valve-face containing a port, a stationary signal block forming another part of the signal-receiver, adjacent to the signal-rotor and having a plurality of ports with which the port in the signal-rotor registers seriatim, passages in the signal block to connect the ports thereof with signal pipes, means to connect the port in the signal-rotor with the fluid-pressure operated ratchet mechanism to actuate the same upon receipt of a pressure pulse through one of the ports in the signal-block of the signal-receiver, an operation-controller having a movable element which is mounted on the rotor shaft and carries an operation-control port, the operation-control port at each step of the rotor shaft registering with one of a series of ports in a fixed distribution-block connected to pipes for operating parts of a machine which is to be controlled by the unit.

4. A control unit as claimed in claim 3, wherein the fluid pressure operated ratchet means for rotating the rotor shaft are operable by pneumatic pressure.

5. A control unit as claimed in claim 3, wherein between the signal receiver and the fluid-pressure operated ratchet means there is interposed a fluid-pressure relay-valve.

6. A control unit as claimed in claim 4, wherein the movable element of the operation-controller is formed as part of the same block as the signal-rotor.

7. A control unit as claimed in claim 1 wherein between the signal-receiver and the pneumatically-operated ratchet mechanism there is interposed a pneumatic relay-valve.

8. A control unit for a fluid-pressure operated system of motors comprising in combination an operation controller comprising a rotatable element having an operation-control port with a supply conduit for fluid pressure thereto and a distribution block having a series of ports over which the control-port moves seriatim, with distribution conduits extending therefrom, a signal receiver comprising a rotatable ported signal-rotor operatively connected to the movable element of the operation-controller to move therewith, a stationary signal block in juxtaposition to the rotor having a series of signal ports over which the ported signal rotor moves and conduits extending thereto, fluid-pressure operated ratchet means operatively connected to the rotatable element of the operation controller and of the signal rotor to move them together stepwise, and conduit means connecting the ported signal-rotor to the operating-means of the ratchet-means.

9. A control system for a machine having self-acting devices for effecting its functions, comprising a control unit as claimed in claim 8, limit-valve means capable of operation by moving parts of the machine at the conclusion of each self-acting operation, pipes communicating said limit-valve means to the passages in the signal block, and pipes connecting the distribution conduits of the operation controller to the appropriate self-acting devices, on the machine, to effect the successive functions.

References Cited in the file of this patent

UNITED STATES PATENTS

| 25,132 | Mitchell | Aug. 16, 1859 |
| 1,078,151 | Lamb | Nov. 11, 1913 |
| 1,745,707 | Perrett | Feb. 4, 1930 |
| 1,851,502 | Ferris et al. | Mar. 29, 1932 |

FOREIGN PATENTS

| 814,622 | Great Britain | June 10, 1959 |